Figure 1:
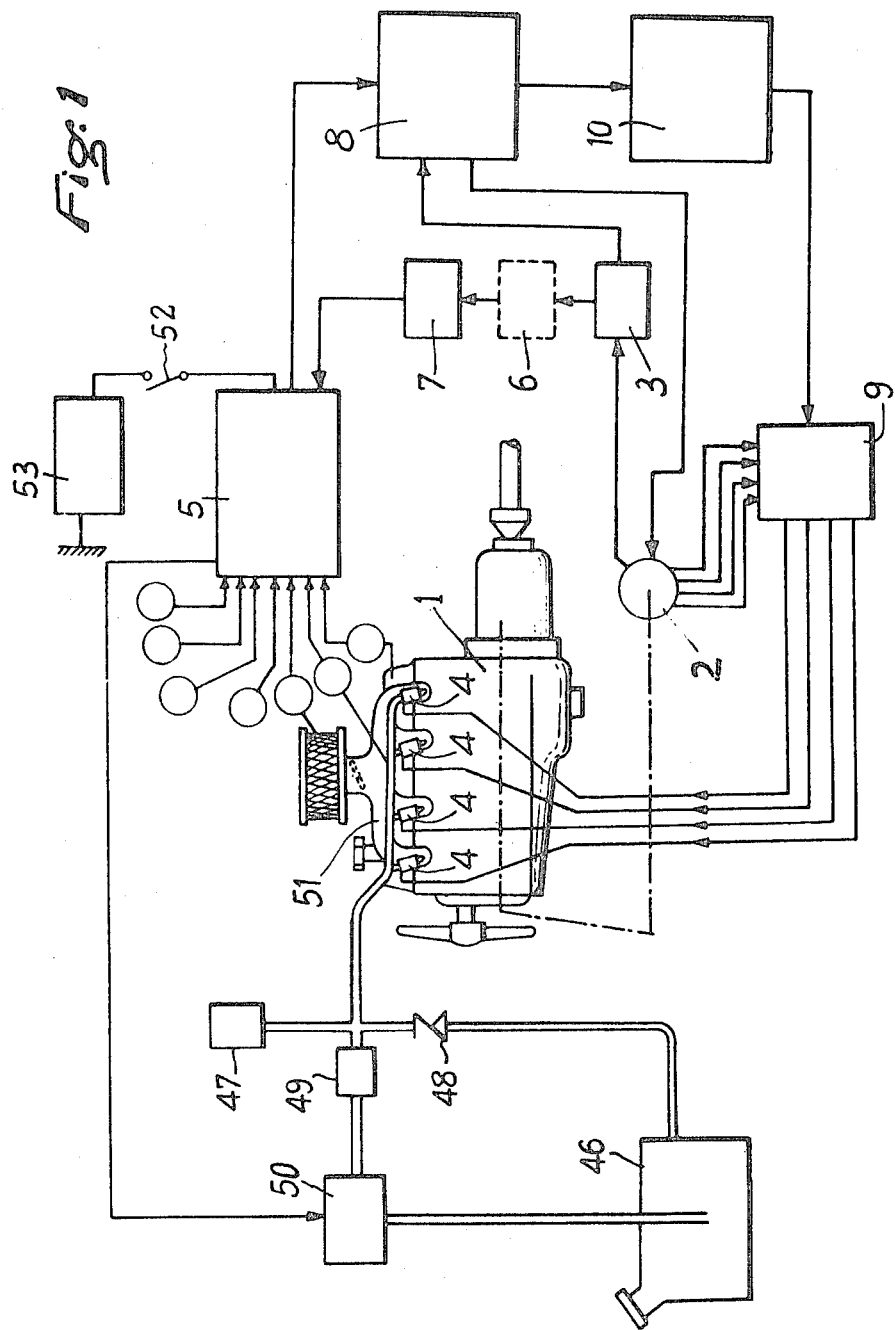

United States Patent
Monpetit

[15] 3,651,792
[45] Mar. 28, 1972

[54] ELECTRONIC INJECTION CONTROL MEANS FOR INTERNAL COMBUSTION ENGINES

[72] Inventor: Louis A. Monpetit, Etang-La-Ville, France

[73] Assignee: Societe Des Procedes Modernes D'Injection Sopromi, Les Mureaux, France

[22] Filed: Aug. 27, 1970

[21] Appl. No.: 67,336

[30] Foreign Application Priority Data

Sept. 5, 1969 France..............................6930283

[52] U.S. Cl.....................................123/32 EA, 123/119 R
[51] Int. Cl.....................................F02b 3/00, F02b 33/00
[58] Field of Search..............................123/32 CL

[56] References Cited

UNITED STATES PATENTS

| | | | |
|---|---|---|---|
| 3,593,692 | 7/1971 | Scholl | 123/32 EA |
| 2,918,911 | 12/1959 | Guiot | 123/32 |
| 3,051,152 | 8/1962 | Paule | 123/32 |
| 3,240,191 | 3/1966 | Wallis | 123/32 |
| 3,456,628 | 7/1969 | Bassot | 123/32 |
| 3,500,801 | 3/1970 | Long | 123/32 |
| 3,504,657 | 4/1970 | Eichler | 123/32 |

Primary Examiner—Laurence M. Goodridge
Assistant Examiner—Ronald B. Cox
Attorney—Kenyon & Kenyon Reilly Carr & Chapin

[57] ABSTRACT

In fuel injection systems, a method and apparatus for preventing overlap of injections and thus increasing the efficiency of internal combustion engines and reducing the production of air-polluting combustion products. The system includes means for producing a series of delay pulses in response to engine rotation. Each delay pulse, which is of short duration in comparison to an injection pulse, disables the power control unit of the injectors for its duration. The termination of said delay pulse triggers the generation of the injection pulse as well as actuating the power control unit and producing a distributing pulse which activates distributing means for energizing the proper injector the desired energization sequence.

11 Claims, 3 Drawing Figures

INVENTOR
LOUIS A. MONPETIT
BY
Kenyon & Kenyon Reilly Carr & Chapin
ATTORNEYS

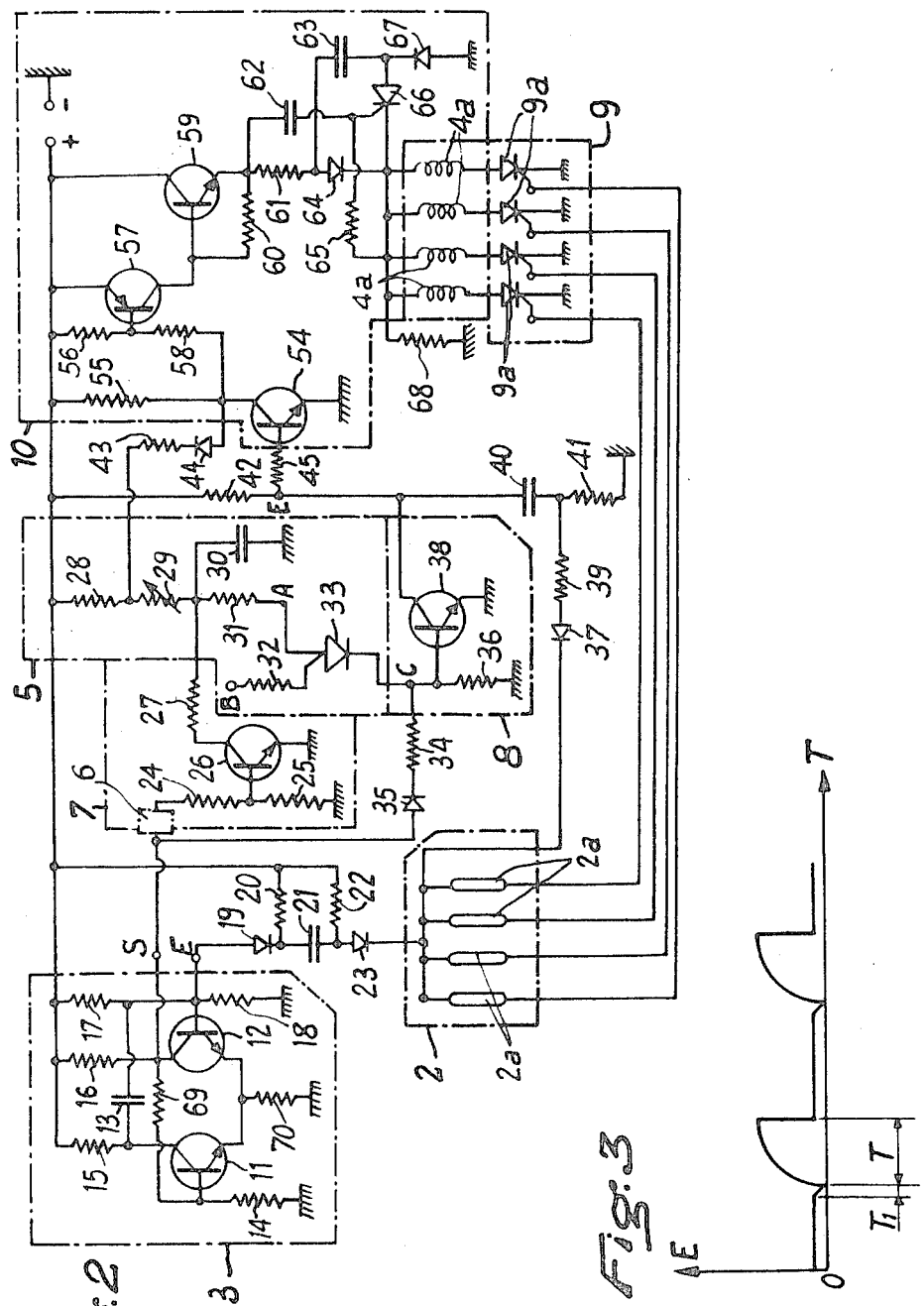

ELECTRONIC INJECTION CONTROL MEANS FOR INTERNAL COMBUSTION ENGINES

The present invention concerns improvements in methods and apparatus for the electronic control of full injection in internal combustion engines.

Such apparatus is known in various forms. It generally consists of electromagnetic injectors which receive current pulses whose duration is a function of the operating conditions of the engine, the said pulses being produced by a timing element consisting, for example, of a monostable multivibrator. In addition, such known apparatus comprises a pulse generator and a distributor for distributing the injection signals to the desired injectors in accordance with order of the injection.

However, the known apparatus has certain disadvantages. One important disadvantage is that when a high engine speed is reached, the injection signals at the cylinders overlap, so that subsequent injection must commence before the termination of the preceding one. When this happens no control of the injectors is possible, especially if thyristors are employed in the distributing circuit, because these thyristors will not be deenergised and all the injectors will start to inject at the same time without interruption. During this time, the apparatus is overloaded, because it must supply the current for all the injectors at the same time. When the engine speed finally falls and the apparatus is to operate normally, there is a danger of destruction of circuit components due to the excessive current generated in the solenoids of the injectors through simultaneous cutoff of the injection signals in a plurality of injectors.

It would, of course, be possible to provide an overspeed regulator which cuts off the injection when a certain speed is reached. This solution however is not suitable for use in automobile engines for example, because it may be dangerous to cut off power at high speeds as when the driver is attempting to overtake another vehicle.

In the present invention, a signal emitted by a distributor pick-up in synchronism with the engine rotation is transmitted to a generator producing square-wave signals of a fixed duration $T_1$ each time an injection is to take place. The signal $T_1$ is transmitted to a device for triggering a timing element at the end of the signal $T_1$, and to a device for triggering the power control unit of the injectors. The power control unit also receives a signal of duration T from the timing element, so that the power control of the injectors is turned off during the duration of the signal $T_1$ even if, at the beginning of the signal $T_1$, the preceding injection control signal T has not yet ended. The end of the signal $T_1$ is also transmitted to a distributor comprising thyristors, through the device for triggering the power control unit of the injectors and through the distributor pick-up in order to fire the thyristors in accordance with the desired order of injection.

Accordingly, it is an object of the present invention to provide an improved electronic control for fuel injection systems in internal combustion engines.

A further object of this invention is to prevent the spurious activation of fuel injectors due to overlapping actuation pulses at high engine speeds.

An additional object of the present invention is to protect circuit elements against excessive currents caused by the cutoff of actuation current in the solenoids of a plurality of injectors at the same time.

These and other objects of the present invention will become more clearly understood by a consideration of the following specification and drawings in which:

FIG. 1 is a block diagram of an injection control system according to the invention, FIG. 2 is a detailed electric circuit diagram of the control elements according to the invention, and FIG. 3 is a graphic illustration of the variation of the voltage across the terminals of the timing element.

Referring to FIG. 1, it will be seen that the injectors 4, disposed in the admission manifold 51 of the engine 1, are fed with fuel at constant pressure by the pump 50, which draws it from the tank 46. The fuel is sent to the injectors 4 through the filter 49, while a hydraulic accumulator 47 and a pressure-regulating valve 48 maintain the pressure as constant as possible.

The electromagnetic injectors 4 are controlled by an electronic device comprising a distributor pick-up 2 dependent upon the rotation of the engine, which pick-up sends a signal to the monostable multivibrator 3 each time an injection is to take place. The said monostable multivibrator emits a square-wave pulse of fixed duration $T_1$ transmitted to a triggering device 7 (optionally through another monostable multivibrator 6), which, at the end of the signal of duration $T_1$, starts the timing element 5. The signal $T_1$ is in addition applied to a triggering device 8 for the injector power control unit 10, the said device being so designed that during the duration of the signal $T_1$ the power control unit 10 is inoperative even if the injection control signal of duration T of the preceding injection has not yet ended. The said injection control signal of duration T generated by the timing element 5 which determines the opening duration of the injectors 4, that is to say, the injected quantity of fuel this quantity being a function of the operating conditions of the engine, such as speed of rotation, pressure in the admission manifold 51, temperature, etc. In order to take account of these various parameters, the timing element 5 comprises multiple inputs connected to corresponding sensing elements. The injection control signals are transmitted from the power control unit 10 to the distributor 9 comprising thyristors device 9a, namely silicon-controlled rectifiers or SCRs, which distributes them to the injectors in accordance with the order of the injections, the distribution signals being transmitted by the distributor pick-up 2 which receives pulses at the beginning of each injection from the triggering device 8.

With the arrangement of FIG. 1, therefore, there is obtained an injection control pulse of duration T which is transmitted to the injectors at time $T_1$ after the pulse emitted by the distributor pick-up 2. Therefore, during the duration of the signal $T_1$, no injection can take place, whereby any overlapping of the injections in case of overspeed of the engine is avoided.

It is to be noted that the duration of the signal $T_1$ is 0.1 to 0.2 milliseconds as compared with a duration of the signal T varies from 0.5 to 4 milliseconds from slow running to full load.

In some cases, it may be desirable to add to the signal of duration T a constant quantity $T_2$. This is effected by providing another monostable multivibrator 6 between the first monostable multivibrator 3 and the triggering device 7. The said second monostable multivibrator 6 is adjusted to have an astable state equal in duration to $T_2$. This duration is added to the duration of the signal T, since the triggering device 8 of the unit 10 for the power control of the injectors is activated immediately upon the termination of signal $T_1$ and is rendered inoperative again when the signal T has terminated or when it is stopped by a further signal $T_1$.

The current is supplied to the electronic device from the battery 53 through a switch 52.

As may be seen from FIG. 2, the monostable multivibrator 3 consists of a conventional monostable flip-flop having two transistors 11 and 12 whose collectors are connected to the voltage source through the resistors 15 and 16 and to ground through the resistor 70. The base of transistor 11 is connected to the collector of transistor 12 through resistor 69 and to ground through resistor 14, and the base of transistor 12 is connected to the voltage source through resistor 17 and to ground through resistor 18. Capacitor 13 is connected between the base of transistor 12 and the collector of the transistor 11. The collector of transistor 12 provides output S of monostable multivibrator 3, while input E is applied to the base of transistor 12.

The distributor pick-up 2 is formed, in a manner known in the art, of switches 2a comprising flexible blades and controlled in accordance with the order of the injections by a magnet operated in dependence upon the rotation of the motor. The said flexible-blade switches 2a are connected to the input E of the monostable multivibrator 3 through diodes 19 and 23 and capacitor 21, the two terminals of which are also connected to the voltage source through resistors 20 and 22 respectively. The said flexible-blade switches 2a are also connected to the control electrodes of the SCRs 9a constituting the thyristor distributor 9.

The triggering device 7 of the timing element 5 consists of a transistor 26 whose base receives the signal of duration $T_1$ from the output S of the monostable multivibrator 3 through a voltage divider consisting of the resistors 24 and 25. The emitter of the said transistor 26 is connected to ground, while the collector is connected to the voltage source through an adjustable resistor 27 and another adjustable resistor 29 and a fixed resistor 28 forming part of the timing element 5.

The timing element 5 consists of a thyristor device means, a silicon controlled rectifier or SCR 33 whose cathode is connected to ground through the resistor 36, of which the control electrode is fixed at a predetermined potential B through resistor 32, while its anode is connected to the voltage source through resistors 31, 29 and 28. Capacitor 30 is connected between the junction point of the resistors 27, 29 and 31 and ground.

The device 8 for triggering the power control unit 10 consists of a transistor whose base is connected to the cathode of the SCR 33, as well as to the output S of the monostable multivibrator 3 through a resistor 34 and a diode 35. The emitter of the transistor 38 is connected to ground, while the collector is connected to the junction point of diode 23 and of the flexible-blade switches 2a through capacitor 40, resistor 39 and diode 37. The junction of capacitor 40 and resistor 39 is connected to ground through resistor 41, while the collector of transistor 38 is connected to the input E of the power control unit 10, which is also connected to the voltage source through resistor 42.

The power control unit comprises the transistors 54, 57 and 59, the first of which has its base connected to the input E through a resistor 45, while its emitter is connected to ground and its collector is connected to the voltage source through resistor 55. The transistors 57 and 59 form a Darlington arrangement, the emitter of 57 and the collector of 59 being connected to the voltage source, and the base of the transistor 57 being connected to the voltage source and to the collector of the transistor 54 through the resistors and 56 and 58, while the collector of transistor 57 is connected to the base of transistor 59 and to its emitter through resistor 60. The solenoids 4a of the injectors are fed from transistor 59 through resistor 61 and diode 64. An energy recovery device is provided, consisting of capacitor 63 in series with diode 67, connected between the junction point of diode 64 and resistor 61 and ground, and of thyristor 66 connected between the junction point of diode 67 and capacitor 63, and the common point of solenoids 4a. The control electrode of said thyristor 66 is connected to the emitter of transistor 59 through capacitor 62 and to the common point of solenoids 4a through resistor 65. The solenoids are connected to ground through resistor 68.

The operation is as follows:

Assuming that the apparatus is operating with a running engine and that no injection is taking place, it will be seen that transistor 12 is conductive owing to the positive voltage applied to its base, and that the transistor 11 is non-conductive. Consequently, the output S is at a very low potential.

Hence, transistor 26 is non-conductive. However, the SCR 33 is conductive with a weak current as indicated in FIG. 3, and maintains transistor 38 conductive. This has the effect of bringing to a very low value the potential applied to the input E of the power control unit 10. Thus, the transistors 54, 57 and 59 are non-conductive and no injection takes place. non-conductive square-wave 13.

If now one of the flexible-blade switches 2a closes, a weak current is set up through the junction between the control electrode and the cathode of the corresponding thyristor 9a, without triggering it. This has the result that a negative pulse is set up at the input E of the monostable multivibrator 3. The transistor 12 becomes non-conductive, the transistor 11 becomes conductive and a positive square-wave signal of duration $T_1$ is produced at the output S; the duration of said signal being determined by the time constant of the circuit comprising the resistors 18 and 70 and the capacitor 13. The signal $T_1$ is applied to the base of transistor 26, which becomes conductive and brings the voltage at A of SCR 33 to a sufficiently low value for it to become non-conductive, since the signal $T_1$ is also applied to the cathode of programmable unijunction transistor 33. At the same time, the base of transistor 38 receives the signal $T_1$ which maintains it conductive although the SCR 33 is then non-conductive. Therefore, for the duration of the signal $T_1$, transistors 26 and 38 the power control unit 10 is inoperative. On the termination of signal $T_1$, transistors 26 and 38 become non-conductive and consequently capacitor 30 is charged through resistors 28 and 29, the time constant of this circuit depending upon the values of resistors 28 and 29 and the capacitance of capacitor 30. In addition the power control unit is rendered operative since the supply voltage is applied to the input E of the power control unit 10, while at the same time a strong positive pulse is transmitted to the control electrode of one of the SCRs 9a through the capacitor 40, the resistor 39, the diode 37 and the corresponding flexible-blade switch 2a. This pulse therefore triggers a SCRs 9a at the same time as the power control unit 10 is rendered operative. The signal at the emitter of transistor 59 triggers thyristor 66 through capacitor 62 and the capacitor 63 is discharged through the injector solenoid 4a corresponding to the thyristor 9a which is conductive at this instant. After the discharge of capacitor 63, the holding current passing through transistor 59 feeds the injector solenoid and renders thyristor 66 non-conductive. The duration T of the holding current is determined by the timing element 5, since the programmable unijunction transistor 33 remains non-conductive as long as the voltage across the terminals of capacitor 30 and hence at the anode A has not reached a predetermined value defined by the voltage applied at B to the control electrode of SCR 33. When this voltage is reached, SCR 33 suddenly becomes conductive by avalanche effect, capacitor 30 is discharged almost completely through SCR 33 and transistor 38 becomes conductive. Consequently, the power control unit 10 is again rendered non-conductive, the magnetic energy in solenoid 4a; in which the current is interrupted, tends to maintain the current flow for a quarter-cycle through the corresponding thyristor 9a, the diode 67, the capacitor 63 and the diode 64. The current is cut off when it changes direction by the diodes 64 and 67. Capacitor 63 remains charged until the next injection, while the thyristors 9a are again rendered non-conductive.

The weak current then passing through the SCR 33 (see FIG. 3) maintains the transistor 38 in the conductive condition, so that the power control unit remains inoperative.

At the next closure of another flexible-blade switch 2a, the same process is repeated.

As has been seen, transistor 38 receives control signals from the timing element 5 and from the monostable multivibrator 3. Consequently, transistor 38 necessarily renders the power control unit 10 inoperative each time it receives a signal from the monostable multivibrator 3, even if the SCR 33 has not yet become conductive again. This means that the duration of the signal T tends to become greater than the time between two successive injections. Now, for reasons stated above, it would be undesirable to have an overlap of the injection control signals at high speeds of engine operation, since the control apparatus would then be inoperative.

Since the signal $T_1$ is also applied to transistor 26, the capacitor 30 is discharged and the timing element 5 can recommence a further cycle after termination of the signal $T_1$. Therefore, even at overspeed of the engine, the injectors receive regular injection signals in the desired order of injections, the duration of which is equal to the difference in time between two successive injections, less the duration of the signal $T_1$.

Since the time between two successive injections is inversely proportional to the speed of rotation, it is clear that the duration of the injections decreases with any increase of the speed of rotation once the signal T has reached a duration equal to that between two successive injections, but this reduction is only very gradual, so that the driving force still remains appreciable. By way of information, it may be noted that the duration T is between 0.5 and 4 milliseconds, so that in the case of a four-cylinder engine the maximum speed of rotation is 7,500 r.p.m. without overlap of the injection signals.

With regard to the monostable multivibrator 3, it may be of very simple design, since no high precision and stability is required here, the signal $T_1$ performing no function in the determination of the injection duration. The duration of the signal $T_1$ is adjusted to 0.1 to 0.2 millisecond by appropriately choosing the resistors 70 and 18 and the capacitor 13. This duration must be slightly greater than the energy recovery time in the capacitor 63, because it must be ended before a further injection can commence.

It is to be noted that, with the described apparatus, it is possible to employ a distributor pick-up 2 which produces with the same flexible-blade switches 2a the triggering of the monostable multivibrator 3 and indirectly the injection control signal, as well as the distribution of the said control signal to the thyristor distributor 9 in accordance with the order of the injections. This is effected by employing a pulse which is produced at the instant of the closing of a flexible-blade switch 2a in order to trigger the monostable multivibrator 3, and to keep the said flexible-blade switch 2a in the closed position at least until the instant when the very strong distribution signal reaches it from transistor 38. In this non-conductive, way, the distributor pick-up has a very long useful life, since the strong pulses are applied only when it is completely closed and the rebounding has ceased.

Another feature of the invention by which the operation of the apparatus is rendered more reliable resides in the fact that a connection is provided between the collector of transistor 54 and the junction point of the resistors 28 and 29 through a diode 44 and a resistor 43. Hence, when transistor 54 is non-conductive i.e. when there is no injection, a positive voltage is produced on the SCR 33, whereby it is more reliably maintained in the conductive condition even when the value of the resistor 28 is high. This makes it possible to use a resistor 28 which is variable with the temperature, for example for obtaining a higher injected quantity at starting and in cold weather.

With very short injection durations, i.e. with very low values of variable resistor 29, the attenuation of the current through SCR 33 is low at the instant when transistor 26 is rendered conductive, so that SCR 33 does not necessarily return to its non-conductive state when the signal $T_1$ is applied to transistor 26. In accordance with the invention, this effect is utilized to obtain a complete cut-off of any injection when the duration thereof tends to become lower than a predetermined value by so choosing the resistor 27 in relation to the resistor 29 that there is no cut off of the SCR 33 when the value of resistor 29 falls below a predetermined value corresponding, for example, to a minimum pressure in the admission manifold 51 of the engine. This pressure may correspond, for example, to that in a vehicle running on a downward gradient with the engine acting as a brake.

Finally, it is possible with the apparatus according to the invention to add temporarily or permanently to the variable injection duration T a fixed value $T_2$ by providing between the connection of the output S of the monostable multivibrator 3 to the transistor 38 and the resistor 24 another monostable multivibrator 6 whose time constant is $T_2$. Since with this arrangement the timing element 5 is rendered inoperative by the signal $T_1$, as is also the transistor 38, an injection commences, but the capacitor 30 is maintained in the discharged condition during the time $T_2$ and therefore the signal T cannot commence until the end of the signal $T_2$.

This solution is advantageous with some engines for adding a fixed quantity which is entirely independent of the other parameters, for example for enrichment of the fuel air mixture during acceleration.

I claim:
1. In internal combustion engines wherein at least one electromagnetic fuel injector is provided for injecting a measured quantity of fuel as a function of the duration of a control pulse applied thereto, the method of preventing overlap of two or more control pulses and consequently overlap of two or more injections, comprising the steps of:
   a. generating a delay pulse of duration $T_1$ each time an injection is to take place;
   b. generating a control pulse of duration T in response to the termination of said delay pulse $T_1$, said duration T being greater than said duration $T_1$;
   c. deactivating the power control means for the fuel injectors during said duration $T_1$;
   d. transmitting said control pulse of duration T to the power control means; and
   e. enabling the power control means to apply said control pulse of duration T to the next electromagnetic fuel injector to be energized in the desired energization sequence, in response to the termination of said delay pulse of duration $T_1$.

2. Apparatus for controlling the injection of fuel in internal combustion engines, wherein control of electromagnetic fuel injectors is accomplished by applying a control pulse to an associated solenoid for energizing said solenoid for the duration of the control pulse, comprising in combination:
   a. means for generating reference pulses in response to the rotation of the engine;
   b. means responsive to said reference pulses for generating delay pulses having a duration $T_1$;
   c. means responsive to said delay pulses for generating control pulses having a duration T;
   d. a power control unit for controlling the application of said control pulses of duration T to said electromagnetic fuel injectors;
   e. triggering means for rendering said power control unit inoperative during said duration $T_1$ so as to prevent any injection from taking place during said duration $T_1$; and
   f. distributor means for applying said control pulse of duration T to the next injector to be energized in response to the termination of said delay pulse of duration $T_1$.

3. The apparatus set forth in claim 2 wherein said means for generating pulses of duration $T_1$ comprises a first monostable multivibrator triggered by said reference pulses.

4. The apparatus set forth in claim 3 further including means for generating pulses having a duration $T_2$ for increasing the duration of said control pulses by said duration $T_2$, said means being connected between said means for generating delay pulses and said means for generating control pulses.

5. The apparatus set forth in claim 4 wherein said means for generating pulses of duration $T_2$ comprises a second monostable multivibrator connected to the output of said first multivibrator.

6. The apparatus set forth in claim 1 wherein said means for generating control pulses comprises a modified relaxation oscillator including a silicon controlled rectifier, and further including means for cutting off said silicon controlled rectifier in response to the termination of said delay pulses of duration $T_1$ so as to generate said control pulses of duration T.

7. Apparatus set forth in claim 6 further including means connecting said silicon controlled rectifier to said power control unit, so as to cause said power control unit to become operative when said silicon controlled rectifier becomes non-conductive.

8. Apparatus as set forth in claim 1 wherein said means for generating reference pulses comprises a plurality of switches for producing a pulse each time one of said switches is actuated in response to engine rotation, the number of said switches being equal to the number of said fuel injectors; means interconnecting said switches with said distributor means, the input to said means for generating delay pulses and the input to said power control unit, the time interval during which said switches are actuated being such that an actuated switch remains closed after the termination of said delay pulse of duration $T_1$ so that the selecting pulse for the next injector to be energized in order may be applied therethrough to said distributing means.

9. The apparatus set forth in claim 8 wherein said distributing means comprises a plurality of silicon controlled rectifier, equal in number to the number of injectors and switches, the control electrode of each silicon controlled rectifiers being connected to one of said switches and said selecting pulses for said distributing means are generated in response to the termination of said delay pulse of duration $T_1$.

10. The apparatus set forth in claim 7 including means for preventing said silicon controlled rectifier from being cut off for injection durations less than a predetermined time interval.

11. The apparatus set forth in claim 10 wherein said means for preventing said silicon controlled rectifiers from being cut off comprises variable resistance means.

* * * * *

UNITED STATES PATENT OFFICE
CERTIFICATE OF CORRECTION

Patent No. 3,651,792      Dated March 28, 1972

Inventor(s)  Louis A. Monpetit

It is certified that error appears in the above-identified patent and that said Letters Patent are hereby corrected as shown below:

Column 1, line 2, "full" should be -- fuel --.

Column 3, line 62, after "SCR" insert -- transistor --.

Column 3, line 67, after "takes place." delete -- non-conducti square wave 13 --.

Column 4, lines 5 and 10, after "SCR" insert -- transistor --.

Column 4, line 11, after "$T_1$", delete -- transistors 26 and 38

Column 4, line 33, "33" should be -- 16 --.

Column 4, lines 36 and 37, after "SCR" insert -- transistor --

Column 5, line 31, after "In this" delete -- non-conductive, -

Signed and sealed this 27th day of February 1973.

(SEAL)
Attest:

EDWARD M. FLETCHER, JR.
Attesting Officer

ROBERT GOTTSCHALK
Commissioner of Patents